United States Patent [19]

Fang

[11] 4,169,024
[45] Sep. 25, 1979

[54] PROCESS FOR ELECTROLYTICALLY PRODUCING CHLORINE IN A CELL HAVING A DIAPHRAGM COMPRISING HYDROPHILIC FLUOROPOLYMERS

[75] Inventor: James C. Fang, Media, Pa.

[73] Assignee: E. I. Du Pont de Nemours and Company, Wilmington, Del.

[21] Appl. No.: 895,496

[22] Filed: Apr. 11, 1978

Related U.S. Application Data

[60] Division of Ser. No. 699,302, Jun. 24, 1976, which is a continuation-in-part of Ser. No. 579,099, May 20, 1975, abandoned.

[51] Int. Cl.$^2$ .......................... C25B 1/26; C25B 1/34; C25B 13/08

[52] U.S. Cl. ..................... 204/98; 204/128; 204/296

[58] Field of Search .................. 204/98, 128, 296

[56] References Cited

U.S. PATENT DOCUMENTS

| | | | |
|---|---|---|---|
| 3,960,697 | 6/1976 | Kircher et al. | 204/296 |
| 4,014,775 | 3/1977 | Kircher et al. | 204/296 |

*Primary Examiner*—R. L. Andrews

[57] ABSTRACT

Certain fluoropolymers, when chemically modified by reacting them with sulfur or phosphorus containing compounds, become hydrophilic materials useful for making ion-exchange membranes, especially diaphragms for electrolytic cells, particularly chlor-alkali cells used in the production of chlorine, hydrogen and sodium hydroxide from brine.

1 Claim, No Drawings

PROCESS FOR ELECTROLYTICALLY PRODUCING CHLORINE IN A CELL HAVING A DIAPHRAGM COMPRISING HYDROPHILIC FLUOROPOLYMERS

CROSS-REFERENCE TO RELATED APPLICATIONS

This application is a division of application Ser. No. 699,302, filed June 24, 1976, which is a continuation-in-part of application Ser. No. 579,099, filed May 20, 1975 and now abandoned.

BACKGROUND OF THE INVENTION

In commercial chlor-alkali cells used for the production of chlorine, hydrogen and sodium hydroxide from brine, asbestos diaphragms are ordinarily used as anion exchange membranes between the anolyte and catholyte compartments.

Diaphragms of this sort are generally satisfactory, but their electrical resistance is high and chlor-alkali cells which use such diaphragms therefore require more electric current for operation than is desirable.

SUMMARY OF THE INVENTION

It has now been found that by chemically modifying certain fluoropolymers with sulfur or phosphorus containing compounds, the fluoropolymers are made hydrophilic. This makes them especially suited for use in making diaphragms for electrolytic cells.

Such diaphragms have less electrical resistance than those made solely of asbestos. There is, accordingly, less power loss in a chlor-alkali cell which uses this new diaphragm and the cell is therefore more efficient. Indeed, it has been observed that the chlorine, hydrogen and caustic production of a cell using this diaphragm can generally be held at the same level as one using an asbestos diaphragm while operating at 10-15% lower voltage.

The hydrophilic fluoropolymers also have the inertness of fluoropolymers generally, and this makes them resistant to attack by the contents of conventional electrolytic cells.

"Hydrophilic", as used in this context, means that the modified fluoropolymers do not repel water as conventional fluoropolymers do, but instead absorb it. The term more specifically means that the modified fluoropolymers have water contact angles of 0° to about 50°, as measured by the method and apparatus described on page 137 of "Contact Angle, Wettability and Adhesion", American Chemical Society, 1964.

Specifically, the hydrophilic fluoropolymers of the invention are chemically modified homopolymers, or copolymers (meaning they contain two or more different monomer units), derived at least in part from olefinic monomers completely substituted with fluorine atoms or completely substituted with a combination of fluorine atoms and no more than one chlorine, bromine or iodine atom per monomer. These fluoropolymers can also contain up to about 75 mol percent of units derived from other ethylenically unsaturated monomers.

These hydrophilic fluoropolymers contain non-terminal units represented by the structure

 (1)

where Z is

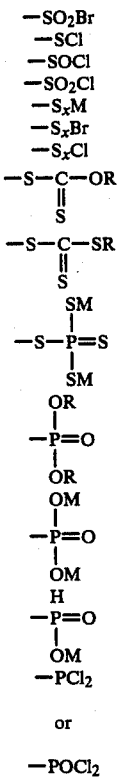

where
M is hydrogen, sodium, potassium, lithium, calcium or magnesium;
R is an alkyl radical of 1-12 carbon atoms or a cycloalkyl radical of 3-12 carbon atoms; and
x is 1, 2, 3, 4 or 5.

Hydrophilic fluoropolymers containing non-terminal units of structure (1) where Z is

are preferred for use as diaphragm materials in electrolytic cells because of their low electrical resistance.

The hydrophilic fluoropolymers can contain more than one type of unit of structure (1).

The hydrophilic fluoropolymer will contain enough units of structure (1) to give it a sulfur or phosphorus content of about 0.1%–10%, by weight, but not so many that more than about 1%, by weight, of the polymer will dissolve in water at 20° C.

Sulfur and phosphorus content is determined gravimetrically by (1) converting the sulfur present to a sulfate in an oxygen flask, then adding $BaCl_2$ and weighing the $BaSO_4$ precipitate, as described by J. H. Karchmer on pages 112–114 of "The Analytical Chemistry on Sulfur and its Compounds, Part I", Wiley-Interscience, 1970; or (2) converting the phosphorus present to a phosphate by the Schoniger oxygen flask method, then adding ammonium molybdate and weighing the ammonium molybdophosphate precipitate, as described by M. Halmann on pages 15, 16, 22 and 23 of "Analytical Chemistry of PhosPhorus Compounds", Wiley Interscience, 1972.

Water solubility is determined by running a sample of polymer in a Soxhlet extractor for 24 hours, using deionized water as a solvent.

When a hydrophilic fluoropolymer of the invention is to be used as a diaphragm material in an electrolytic cell, it preferably contains enough units of structure (1) to give it an electrical resistance of about 0.1–100 ohms per square centimeter of surface area. Resistance is determined using conventional instruments to measure the voltage and amperage of a current flowing through the material under actual use conditions, computing the resistance using Ohm's law, and then dividing the resistance by the area, in square centimeters, of the material.

The preparative methods to be described will give hydrophilic fluoropolymers with the foregoing chemical and electrical characteristics.

The hydrophilic fluoropolymers of the invention containing units of structure (1) which are ionic are useful as materials for ion-exchange membranes. The hydrophilic fluoropolymers which contain units of structure (1) which are nonionic can be used as materials for semi-permeable membranes in osmotic procedures and in dialysis.

DETAILED DESCRIPTION OF THE INVENTION

How The Hydrophilic Fluoropolymers Are Made

The hydrophilic fluoropolymers of the invention can be made by two methods. Each method requires a fluoropolymer starting material and a modifying compound.

"Fluoropolymer starting material", as used here, means a homopolymer or copolymer (meaning the copolymer contains two or more different monomer units) derived at least in part from olefinic monomers completely substituted with fluorine atoms or completely substituted with a combination of fluorine atoms and no more than one chlorine, bromine or iodine atom per monomer.

Representative of such fluoropolymer starting materials are homopolymers and copolymers (in all monomer unit weight ratios) of
(1) tetrafluoroethylene (TFE)
(2) hexafluoropropylene (HFP)
(3) chlorotrifluoroethylene (CTFE) and
(4) bromotrifluoroethylene. (BTFE)

These fluoropolymer starting materials can also contain up to about 75 mol percent of units of other ethylenically unsaturated monomers which contain at least as many fluorine atoms as carbon atoms, for example, vinylidene fluoride. Optionally, minor amounts of olefins containing 2–4 carbon atoms can also be present. Illustrative of the fluoropolymer starting materials which result from use of these other ethylenically unsaturated monomers are those described on pages 9 and 10 of copending application Ser. No. 562,648, filed Mar. 27, 1975 by Apotheker and Krusic.

When these other ethylenically unsaturated monomer units are present in a fluoropolymer starting material which is to be modified and made into a diaphragm for an electrolytic cell, it is preferred that the units of structure (1) be present in the form

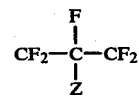

to avoid possible alpha,beta elimination of hydrogen fluoride under extreme conditions of heat and alkalinity found in some electrolytic cells.

The fluoropolymers preferred as starting materials because of the low electrical resistance of the hydrophilic fluoropolymers which result when they are used are
(1) polytetrafluoroethylene (PTFE)
(2) polychlorotrifluoroethylene (PCTFE)
(3) polybromotrifluoroethylene (PBTFE) and
(4) copolymers (in all monomer unit weight ratios) of
 (a) TFE and HFP
 (b) TFE and CTFE
 (c) TFE and BTFE
 (d) CTFE and BTFE and
 (e) TFE and perfluoroalkyl vinyl ether, (especially perfluoromethyl vinyl ether).

PCTFE, the TFE-BTFE copolymers and the TFE-CTFE copolymers are especially preferred because their reactivity makes it easier to prepare the hydrophilic fluoropolymers of the invention from them.

Mixtures of fluoropolymer starting materials can also be used.

The molecular weight of the fluoropolymer starting material, and of the hydrophilic fluoropolymer product, is unimportant. A low molecular weight fluoropolymer which itself may lack the physical strength needed for the use intended can be coated on a fabric substrate made of such things as glass fibers, asbestos or PTFE fibers and then modified, or can be crosslinked after modification, to provide the strength.

The fluoropolymer starting materials are either commercially available or can be made by well known methods. See for example, "Fluoropolymers", Leo A. Wall, Wiley-Interscience, 1972, Chapter 1, "Polymerization of Fluoroolefins", pages 1–29.

In both methods of preparing the hydrophilic fluoropolymer, the fluoropolymer starting material can be in the form of a powder, a porous or nonporous unsupported film, a porous reinforced structure, a coating on an inert fabric, or in the form of fibers.

The fluoropolymer starting materials are available commercially, or can be conventionally made, as powders or as dispersions from which powders can be extracted. These powders ordinarily contain particles having an average longest dimension of about 0.1–10 microns, with no particles having a longest dimension greater than about 50 microns. These dimensions are measured optically, against a standard.

A porous unsupported film can be made from powders of fluoropolymer starting material according to conventional cellulose spongemaking procedures. Sodium chloride or calcium chloride (about 50–60%, by weight of the fluoropolymer starting material) is first dissolved in an aqueous dispersion of fluoropolymer starting material (about 20%–25% by weight of solids). This solution-dispersion is then cast on a plate to a thickness of about 0.1–5 millimeters, air-dried and then heated to fuse the fluoropolymer starting material. The resulting film is cooled, stripped from the plate and then immersed in water for 2–3 days at 20° C. to extract the chloride and give a porous unsupported film of fluoropolymer starting material.

A nonporous unsupported film of fluoropolymer starting material can be made according to the foregoing procedure by simply omitting the addition of sodium chloride or calcium chloride to the polymer dispersion, and omitting the subsequent immersion in water.

A porous reinforced structure of fluoropolymer starting material can be made by coating a fabric of glass fibers, asbestos, PTFE fibers, or the like, with a dispersion containing about 5%–25% by weight of a fluoropolymer starting material and about 10%–25% by weight of a polymer soluble in the carrier and stable at the fluoropolymer fusion temperature, such as polyvinyl acetate or an acrylic polymer such as polymethylmethacrylate. The carrier for the dispersion is a solvent for the polymethylmethacrylate, such as toluene or methylisobutyl ketone. If the fluoropolymer starting material is other than a TFE-HFP copolymer, adhesion of that polymer to the fabric can be improved by adding about 2%–5%, by weight of the dispersion, of TFE-HFP copolymer (85/15 weight ratio) to the dispersion. The dispersion is applied to both sides of the fabric to give a final structure thickness of about 0.1–5 millimeters.

The coated fabric is heated to fuse the fluoropolymer starting material and give a continuous coating. The fabric is then soaked at 50°–130° C. for 2–4 hours, with agitation, in a solvent for the polymethylmethacrylate, such as dimethylacetamide or acetone. This leaches out the polymethylmethacrylate, giving a porous reinforced structure of fluoropolymer starting material.

A nonporous coated fabric can be made by coating a fabric of glass fibers, PTFE fibers, asbestos, or the like, with a dispersion of fluoropolymer starting material, drying it and then heating it to fuse the fluoropolymer. Enough of the dispersion should be used to give a final coating weight of about 0.001–0.5 gram of polymer per square centimeter of fabric and a final coated fabric thickness of about 0.1–5 millimeters, as measured with a micrometer. A porous coated fabric can be made in the same manner by limiting the final coating weight of the fluoropolymer starting material to about 0.01–0.10 grams of polymer per square centimeter of fabric.

Fibers of fluoropolymer starting material can be made by mixing fluoropolymer particles with cellulose xanthate, forcing the mixture through a suitable spinnerette and then baking the resulting fibers at the fluoropolymer's fusion temperature to drive off the xanthate. This procedure is described in Burrows and Jordan, U.S. Pat. No. 2,772,444, granted Dec. 4, 1956. These fibers ordinarily have an average diameter of about 1–20 microns, with no fibers having a diameter greater than about 50 microns. These diameters are measured optically, against a standard.

In an alternative and preferred procedure, a porous reinforced structure can be made from a dispersion which comprises
(a) a fluoropolymer starting material;
(b) a fibrous material which will act as a base for the structure;
(c) optionally, a fluoropolymer binder material; and
(d) a liquid carrier.

This composition can also contain conventional adjuncts such as wetting agents, surfactants, defoamers and the like, in the usual amounts.

A porous reinforced structure can be made from such a composition by first deagglomerating the fibers of (b) and then forming a mat of the fibers by removing the carrier, preferably by a papermaking technique. In a highly preferred embodiment of the invention, this porous reinforced structure is formed directly on the cathode screen of an electrolytic cell.

Any fibrous material can be used in (b) which can withstand the baking temperature to be used and which resists attack by the environment in which the structure is to be used. Illustrative of such materials are asbestos
glass fibers
fibers of such fluoropolymers as
PTFE or TFE-HFP copolymers and
potassium titanate fibers.

Mixtures of such fibrous materials can also be used. Asbestos is the preferred fibrous material for use in electrolytic cell diaphragms. Especially preferred is a chrysotile asbestos whose fibers have an average diameter of about 200 Å (as measured by electron microscopy) and an average length of about 70 mm.

Similarly, the fluoropolymer to be used as a binder material in (c) can be any which resists attack by the environment in which it is to be used. Illustrative are PTFE
TFE-HFP copolymers (all monomer ratios)
polyvinyl fluoride
polyvinylidene fluoride and
vinylidene fluoride/hexafluoropropylene copolymers (all monomer ratios).

Mixtures of binder materials can also be used.

In electrolytic cell diaphragms, the TFE-HFP copolymers are preferred as binder materials because of their inert nature.

The carrier in (d) can be any liquid which will not significantly affect the chemical or physical characteristics of the structure. Illustrative of such liquids are water
chlorinated hydrocarbons
methanol
hexane and
brine When the composition is to be used to make an electrolytic cell diaphragm, a 15% by weight brine solution is preferred as a carrier because it helps keep the fibrous material in suspension.

The components of the composition are preferably present in the following concentrations:
(a) fluoropolymer starting material—10–90% by weight of the total of (a) and (b), even more preferably 40–60%;
(b) binder—10–90% by weight of the total of (a) and (b), even more preferably 40–60%;
(a) plus (b) constituting 10–90%, by weight of the total of (a), (b), and (c), preferably 20–25%;
(c) fibrous material—10–90%, by weight of the total of (a), (b), (c), even more preferably 75–80%; and
(d) carrier—the remainder.

The composition will contain 0.01–3%, by weight, of solids, preferably about 1%.

PREPARATIVE METHOD ONE

In the first method of preparation, the fluoropolymer starting material, in whatever form, is exposed to radiation while it is in contact with a suitable modifying compound, or the fluoropolymer and modifying compound are brought together in the presence of a peroxy compound such as benzoyl peroxide of t. butyl peroxide.

Any compound which contains a sulfur or phosphorus atom which can react with the fluoropolymer starting material can serve as a modifying compound. Representative of these are

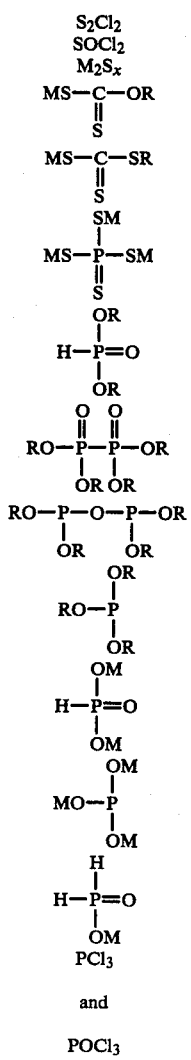

where
M is hydrogen, sodium, potassium, lithium, calcium or magnesium;
R is an alkyl radical of 1–12 carbon atoms or a cycloalkyl radical of 3–12 carbon atoms; and
x is 1, 2, 3, 4 or 5.

Mixtures of modifying compounds can also be used.

The irradiation is accomplished by first placing a fluoropolymer starting material, in whatever form, in a saturated solution of modifying compound in water or other inert solvent such as benzene. If the modifying compound is itself a liquid, no other liquid need be used. The amount of solution or liquid in which the fluoropolymer starting material is placed should be such that the starting material is thoroughly wetted, but not so much that the passage of radiation through the liquid is impeded. About 0.1–1%, by weight, of a surfactant such as perfluorooctanoic acid may be added to aid wetting.

The liquid containing the fluoropolymer starting material and modifying compound is then exposed to about 0.1–20 megarads of electron radiation or to about 0.1–50 watts per square centimeter of liquid surface of ultraviolet light, at 20° C.

The irradiation is done in conventional equipment. If desired, it can be performed continuously, with fluoropolymer starting material and modifying compound being fed into the equipment and hydrophilic fluoropolymer of the invention being removed.

After the irradiation step is completed, the product is separated from the liquid and washed with water. Drying is optional and can be done conventionally.

The irradiation also crosslinks the hydrophilic fluoropolymers of the invention based on PCTFE and TFE-CTFE and TFE-BTFE copolymer starting materials, thereby physically strengthening them.

When the fluoropolymer starting material and modifying compound are brought together in the presence of a peroxy compound, the procedure is the same except that irradiation is omitted. Peroxy compound, about 10–100 mol percent of the fluoropolymer starting material, is added to the liquid in which the fluoropolymer has been placed. This liquid, with the fluoropolymer in it, is then held at 80°–150° for 5–36 hours. The polymer is then separated from the liquid, washed with water, and, optionally, dried.

PREPARATIVE METHOD TWO

In this method, the fluoropolymer starting material and modifying compound are brought into contact with each other, under conditions suitable for reaction, and kept together until the reaction is complete.

This method can only be used with homopolymers and copolymers of CTFE and BTFE as starting materials.

The modifying compounds used are

Sulfur

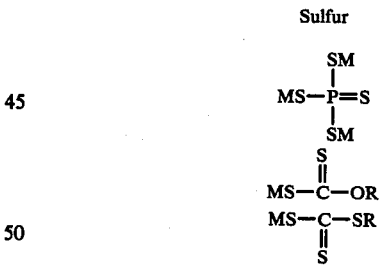

or $M_2S_x$ where
M is hydrogen, sodium, potassium, lithium, calcium or magnesium;
R is an alkyl radical of 1–12 carbon atoms or a cycloalkyl radical of 3–12 carbon atoms; and
x is 1, 2, 3, 4 or 5.

Mixtures of these compounds can also be used.

The fluoropolymer starting material, preferably in the form of a porous unsupported film or a porous reinforced structure, is placed in a 2%–10%, by weight, solution of modifying compound in dimethylformamide or dimethylacetamide. As in Preparative Method One, only enough of the solution is used to thoroughly wet the fluorocarbon polymer starting material. If desired, a small amount of cesium fluoride or potassium fluoride can be added to the solution to suppress side reactions.

The solution, with the fluoropolymer starting material in it, is then brought to a temperature within the range of about 20° C. to about the boiling point of the solvent used, to bring about the reaction. The solution is held at that temperature for about 4–200 hours, the reaction at lower temperatures requiring more time for completion than one carried out at higher temperatures. When the initially colorless fluoropolymer starting material turns black, the reaction is complete.

In both methods of preparation, the modifying compounds used will provide radicals which will be attached directly to the fluoropolymer chain. These compounds, and the radicals they provide, are shown in the following table:

| Compound | Attached Radical (Z Group) |
|---|---|
| Sulfur | $-S_xBr$ or $-S_xCl$ |
| $S_2Cl_2$ | $-SCl$ |
| $SOCl_2$ | $-SOCl$ |
| $SO_2Cl_2$ | $-SO_2Cl$ |
| $M_2S_x$ | $-S_xM$ |
| $MS-\underset{\underset{S}{\|}}{\overset{\|}{C}}-OR$ | $-S-\underset{\underset{S}{\|}}{\overset{\|}{C}}-OR$ |
| $MS-\underset{\underset{S}{\|}}{\overset{\|}{C}}-SR$ | $-S-\underset{\underset{S}{\|}}{\overset{\|}{C}}-SR$ |
| $H-\underset{\underset{OR}{\|}}{\overset{\overset{OR}{\|}}{P}}=O$ | $-\underset{\underset{OR}{\|}}{\overset{\overset{OR}{\|}}{P}}=O$ |
| $RO-\underset{\underset{OR}{\|}}{\overset{\overset{OR}{\|}}{P}}$ | $-\underset{\underset{OR}{\|}}{\overset{\overset{OR}{\|}}{P}}=O$ |
| $H-\underset{\underset{OM}{\|}}{\overset{\overset{OM}{\|}}{P}}=O$ | $-\underset{\underset{OM}{\|}}{\overset{\overset{OM}{\|}}{P}}=O$ |
| $MO-\underset{\underset{OM}{\|}}{\overset{\overset{OM}{\|}}{P}}$ | $-\underset{\underset{OM}{\|}}{\overset{\overset{OM}{\|}}{P}}=O$ |
| $H-\underset{\underset{OM}{\|}}{\overset{\overset{H}{\|}}{P}}=O$ | $-\underset{\underset{OM}{\|}}{\overset{\overset{H}{\|}}{P}}=O$ |
| $MS-\underset{\underset{SM}{\|}}{\overset{\overset{SM}{\|}}{P}}=S$ | $-S-\underset{\underset{SM}{\|}}{\overset{\overset{SM}{\|}}{P}}=S$ |
| $PCl_3$ | $-PCl_2$ |
| $POCl_3$ | $-POCl_2$ |
| $RO-\underset{\underset{RO}{\|}}{\overset{\overset{O}{\|\|}}{P}}-\underset{\underset{OR}{\|}}{\overset{\overset{O}{\|\|}}{P}}-OR$ | $-\underset{\underset{OR}{\|}}{\overset{\overset{OR}{\|}}{P}}=O$ |
| $RO-\underset{\underset{RO}{\|}}{\overset{\|}{P}}-O-\underset{\underset{OR}{\|}}{\overset{\|}{P}}-OR$ | $-\underset{\underset{OR}{\|}}{\overset{\overset{OR}{\|}}{P}}=O$ | where
M is hydrogen, sodium, potassium, lithium, calcium or magnesium;
R is an alkyl radical of 1–12 carbon atoms or a cycloalkyl radical of 3–12 carbon atoms; and
x is 1, 2, 3, 4 or 5.

It should be noted that the radicals which result when the sulfur compounds in the following list are used as modifiers can be converted into $-SO_3H$ radicals by treating the hydrophilic fluoropolymers bearing these radicals with saturated chlorine water or 25%–50% (by weight) aqueous hydrogen peroxide for 2–20 hours at 20° C. The radicals which result when the phosphorus compounds are used can be converted into $$-\underset{\underset{OM}{\|}}{\overset{\overset{OM}{\|}}{P}}=O$$

radicals by treating the hydrophilic fluoropolymers bearing these radicals with a 5% solution of NaOH in methanol.

sulfur
$S_2Cl_2$
$SOCl_2$
$SO_2Cl_2$
$M_2S_x$ $MS-\underset{\underset{S}{\|}}{\overset{\|}{C}}-OR$ $MS-\underset{\underset{S}{\|}}{\overset{\|}{C}}-SR$ $MS-\underset{\underset{S}{\|}}{\overset{\overset{SM}{\|}}{P}}-SM$ $H-\underset{\underset{OM}{\|}}{\overset{\overset{H}{\|}}{P}}=O$ and
$PCl_3$ where
M is hydrogen, sodium, potassium, lithium, calcium or magnesium;
R is an alkyl radical of 1–12 carbon atoms or a cycloalkyl radical of 3–12 carbon atoms; and
x is 1, 2, 3, 4 or 5.

HOW THE HYDROPHILIC FLUOROPOLYMERS ARE PUT INTO USABLE FORM

Unmodified porous and nonporous unsupported films and unmodified porous reinforced structures of fluoropolymer starting material, and unmodified nonporous fabrics coated with fluoropolymer starting material, prepared by the methods previously described and then modified by Preparative Method One or Preparative Method Two, can be used directly without further fabrication.

Felt can be prepared from fibers of hydrophilic fluoropolymer using well-known felting methods.

A porous unsupported film can be made from a powder of hydrophilic fluoropolymer according to the conventional spongemaking techniques already described.

When these porous products are to be used as diaphragms in electrolytic cells, they preferably should be able to pass about 0.01–5 cubic centimeters of liquid per square centimeter of surface area per minute. This flow rate is measured by conducting a predetermined amount of liquid through the product, collecting the liquid and measuring the amount collected, measuring the time required to collect the liquid, dividing the amount collected by the time required to collect it, and then dividing that quotient by the area of the product (in square centimeters).

The flow rate requirement will vary with the use. When used in chlor-alkali cells, for example, porous unsupported films or porous reinforced structures should be able to pass about 0.02–1 cubic centimeters of brine per square centimeter of surface area per minute.

In a porous unsupported film or a porous reinforced structure, the proper flow rate can be obtained by varying the thickness of the film or structure, or by varying the porosity through changing the ratio of chloride or polymethylmethacrylate to fluoropolymer starting material or hydrophilic fluoropolymer in the fabrication step. Varying the chloride ratio is done routinely in the cellulose sponge art according to well-known principles, and the desired porosity can be obtained in a film or a reinforced structure by applying those principles to this technology.

Ordinarily, the proper flow rate can be obtained with pores having an average longest transverse (to the direction of flow) dimension of about 0.1–10 microns, with no transverse dimension larger than about 15 microns. Pore size is measured optically, against a standard. The porous unsupported film or porous reinforced structure will have a pore density of about 10,000–1,000,000 pores per square centimeter of surface area, as counted with the aid of a microscope.

If the porous unsupported film or porous reinforced structure is to be used as a diaphragm material for a chloralkali cell, its pores ordinarily have an average longest transverse (to the direction of flow) dimension of about 0.1–2 microns, with no transverse dimension larger than about 10 microns, and a pore density about 10,000–1,000,000 pores per square centimeter.

If these porosities and pore densities do not give precisely the flow rate desired, a few simple measurements followed by appropriate adjustments in the amount of chlorides or polymethylmethacrylate used should give the proper flow rate. In the case of felt, the proper flow rate can be obtained by coordinating its thickness with the number of fibers per unit volume, as is well known.

The tensile strengths of the various products just described need only be high enough to enable the forms to withstand the stresses encountered in use. These products have the requisite strength inherently.

After a porous or nonporous unsupported film, porous reinforced structure, nonporous coated fabric or porous felt of hydrophilic fluoropolymer has been made, it can be used directly for whatever use is intended by simply trimming it to the correct dimensions and placing it in position in the apparatus used.

The preferred method of preparing a diaphragm for a chloralkali cell is the same as that previously described for making a preferred porous reinforced structure starting material, except that a finished hydrophilic fluoropolymer is used instead of a fluoropolymer starting material. As in the previously described method, a diaphragm can be made from a dispersion which comprises (a) a hydrophilic fluoropolymer, preferably in the form of a powder;
(b) a fibrous material which will act as a base for the diaphragm;
(c) optionally, a fluoropolymer binder material; and
(d) a liquid carrier.

This composition, as the one previously described, can also contain conventional adjuncts such as wetting agents, surfactants, defoamers and the like, in the usual amounts.

A chlor-alkali cell diaphragm can be made from such a composition by first deagglomerating the fibers of (b) and then forming a mat of fibers by removing the carrier, preferably by a papermaking technique. Even more preferably, the diaphragm is thus formed in situ on the cathode screen of the cell. However formed, the diaphragm is then heated to fuse the fluoropolymer binder, if it is present. The diaphragm is then ready for use.

The fibrous materials, the fluoropolymer binders, the carriers, and the preferred embodiments and concentrations of these are as previously set forth in the description of preparing a porous reinforced structure for modification according to the invention.

Diaphragms for electrolytic cells, made in situ in this way and as previously described, must meet the operator's specifications regarding permeability, current efficiency and dimensional stability. These specifications vary with the operator, the type of cell being used, electrical current demands of the cell, and like factors. One skilled in the diaphragm making art will use the same skills in preparing these in situ diaphragms that he does in preparing conventional asbestos diaphragms, and by applying those skills will, without difficulty, be able to prepare diaphragms that will meet all of any manufacturer's requirements.

While the hydrophilic fluoropolymers of the invention are most useful as diaphragm materials for electrolytic cells, especially chlor-alkali cells, they can also be used as materials for membranes to be used in other ion-exchange procedures, as in desalinization of sea water, and as materials for semi-permeable membranes to be used in osmotic procedures and in dialysis.

When a hydrophilic fluoropolymer is to be used as a membrane for osmosis or dialysis, an appropriate modifying compound must be used to make the polymer properly ionic or non-ionic, as is well known in the art.

If contaminants which are present in most electrolytic cells, ion-exchange cells or dialysis chambers clog a diaphragm or membrane of hydrophilic fluoropolymer to the point where its efficiency is diminished, the diaphragm or membrane can be rejuvenated by backflushing it with water, rinsing it with concentrated nitric acid and then with water.

The following examples illustrate the invention. In these examples, all parts and percentages are by weight, unless otherwise indicated.

EXAMPLE 1

A piece of "Teflon" fluorocarbon resin cloth (T-162-42, sold by Stern & Stern Textiles, Inc.) was preshrunk by baking it for 10 minutes at 270° C.

A 15% solids aqueous dispersion of tetrafluoroethylene/bromotrifluoroethylene 86/14 copolymer was sprayed on both sides of the cloth to an overall thickness of 100 microns (dry) and the cloth was then baked for 20 minutes at 270° C.

The resulting coated fabric was then placed in a vessel containing a solution of

| | |
|---|---|
| Potassium sulfide | 11 parts |
| Sulfur | 6.4 parts |
| Cesium fluoride | 3.0 parts | in 300 parts of dimethylacetamide.

The vessel was heated on a steam bath for four hours, while the solution containing the fabric was stirred.

The coated fabric was then removed from the vessel, washed with distilled water, submerged in saturated chlorine water and kept there for 16 hours at 20° C.

The fabric was then rinsed with distilled water, dried and placed in the diaphragm position of a laboratory chlor-alkali cell containing saturated brine, where, in operation, it required a voltage of 3.0–3.1 to achieve a current density of 0.204 amperes per square centimeter of diaphragm area.

The flow rate through the diaphragm was found to have been 1.87 cubic centimeters of brine per square centimeter per minute.

The fabric coating had a water solubility of less than 1%.

EXAMPLE 2

| (A) | The following were added to a vessel: | |
|---|---|---|
| | Dispersion of polychlorotrifluoroethylene sold by 3M Co. as "Kel-F" (30% in methylisobutyl ketone) | 200 parts |
| | Dispersion of tetrafluoroethylene/hexafluoropropylene 85/15 copolymer resin (30% in methylisobutyl ketone) | 50 parts |
| | Solution of polymethylmethacrylate resin MW$_n$ 65,000-100,000 (40% in acetone/toluene 2/1 by volume) | 188 parts |

These components were well mixed and a piece of "Teflon" cloth (as per Example 1) dipped into the mixture. The coated cloth was removed, excess mixture was removed by drawing it down with wire-wound rods, and the cloth baked for 30 minutes at 270° C.

The coated cloth was cooled to room temperature and placed in a vessel containing a mixture of xylene and dimethylacetamide (1/1 by volume). The temperature of the mixture was raised to the boiling point of the liquid over a two-hour period and held there for two hours. The resulting porous reinforced structure was then removed.

(B) The porous reinforced structure made in (A) was rolled into a cylindrical shape and placed in a vessel containing a solution of

| Potassium sulfide | 45 parts |
|---|---|
| Sulfur | 5 parts |
| Cesium fluoride | 2 parts | in 1500 parts of dimethylacetamide. The vessel was sealed and rolled for 88 hours. The porous structure was then removed, washed with distilled water, submerged in saturated chlorine water and kept there for three hours at 20° C., with stirring.

The porous reinforced structure was then dried and placed in the diaphragm position of a laboratory chloralkali cell containing saturated brine, where, in operation, it required an average voltage of 3.06 to achieve a current density of 0.204 amperes per square centimeter of diaphragm area.

The flow rate through the diaphragm was found to have been 1.04 cubic centimeters of brine per square centimeter per minute.

The cloth coating had a water solubility of less than 1%.

EXAMPLE 3

A porous reinforced structure was prepared as in Example 2(A).

This was air-dried, thoroughly soaked with dimethylphosphite and then given one megarad of electron radiation with an electron beam resonant transformer.

The irradiated porous structure was placed in a 5% solution of sodium hydroxide in methanol, which was then heated to reflux temperature and held there for one hour, with stirring. The structure was removed, washed in distilled water for 15 minutes, dried and placed in the diaphragm position of a laboratory chlor-alkali cell containing saturated brine.

Direct current was applied. The current flow initially was one ampere at 8.8 volts; after two hours, the flow was one ampere at 8.1 volts. The flow rate was found to have been 0.074 cubic centimeters of brine per square centimeter per minute.

The cloth coating had a water solubility of less than 1%.

EXAMPLE 4

| (1) A mixture of | |
|---|---|
| Tetrafluoroethylene/bromotrifluoroethylene 84/16 copolymer powder | 22 parts |
| Methylisobutyl ketone | 66 parts | was ball-milled for 30 minutes.

| (2) The dispersion of (1) was added to a mixture | |
|---|---|
| Tetrafluoroethylene/hexafluoropropylene 85/15 copolymer resin dispersion (30% in methylisobutyl ketone) | 18.3 parts |
| Solution of polymethylmethacrylate resin MW$_n$ 65,000–100,000 (40% in acetone-toluene 2/1 by volume) | 68.8 parts |
| Methylisobutyl ketone | 60 parts |
| Aminopropyltrimethoxysilane | 1 part |

(3) A piece of asbestos paper of the type used in chlor-alkali cells was thoroughly soaked in the product of (2) and then baked for 30 minutes at 315° C.

(4) The porous reinforced structure of (3) was placed in a vessel containing a solution of

| Dimethylacetamide | 850 parts |
|---|---|
| Potassium polysulfide | 33 parts |
| Potassium fluoride | 13 parts |

The vessel was filled with nitrogen, sealed and held for 8 days at room temperature. The coated paper was then removed.

(5) The product of (4) was soaked in saturated chlorine water for 8 hours and then air-dried.

The resulting material was suitable for use as a diaphragm material in a chlor-alkali cell.

EXAMPLE 5

| (1) A mixture of | |
|---|---|
| Tetrafluoroethylene/chlorotrifluoroethylene 87.5/12.5 copolymer powder | 16.5 parts |
| Methylisobutyl ketone | 50 parts | was ball-milled for 30 minutes.

-continued

| | |
|---|---|
| (2) To the dispersion of (1) was added a mixture of | |
| Tetrafluoroethylene/hexafluoropropylene 85/15 copolymer resin dispersion (30% in methylisobutyl ketone) | 13.7 parts |
| Solution of polymethylmethacrylate resin $MW_n$ 65,000–100,000 (40% in acetone/toluene 2/1 by volume) | 51.6 parts |
| Aminopropyltrimethoxysilane | 0.75 part |

(3) The ball mill used in (1) was rinsed with 15 parts of methylisobutyl ketone, which was added to the dispersion of (2). An additional 22.5 parts of methylisobutyl ketone was then added to the dispersion of (2).

(4) A piece of asbestos paper of the type used in chlor-alkali cells was thoroughly soaked in the product of (3) and air dried. Twenty parts of methylisobutyl ketone was added to (3) and the paper again thoroughly soaked in it. The paper was then air-dried and baked for 30 minutes at 315° C.

(5) The following were placed in a glass jar:

| | |
|---|---|
| Dimethylacetamide (dried over molecular sieves) | 400 parts |
| Potassium sulfide | 2.2 parts |
| Sulfur | 6.4 parts |

The jar was sealed and rolled for two hours at room temperature.

(6) The liquid product of (5) was placed in a vessel. The porous reinforced structure of (4) was submerged in the liquid and the vessel placed in an enclosure. The enclosure was purged with nitrogen, sealed and allowed to stand undisturbed for two weeks at room temperature.

The resulting material was suitable for use as a diaphragm material in a chlor-alkali cell.

EXAMPLE 6

A hydrophilic fluoropolymer of the present invention was prepared by (a) providing a fluoroelastomer which is a copolymer containing (on a percent by weight basis) 58.0% vinylidene fluoride units, 39.1% hexafluoropropylene units and 2.9% bromotrifluoroethylene units, said fluoroelastomer having a Mooney viscosity of 38 at 100° C. when measured on a Mooney viscometer using the large rotor and a ten-minute shearing time;

(b) grinding said fluoroelastomer into small particles by using a freeze mill in which the fluoroelastomer was frozen with liquid nitrogen and then hammer-shattered into small particles;

(c) mixing 20 grams of the resulting particulate fluoroelastomer with 20 grams of dimethylphosphite;

(d) mixing one gram of benzoyl peroxide with the resulting mixture;

(e) heating the resulting mixture at reflux (172° C.) for 3 hours;

(f) mixing one gram more of benzoyl peroxide with the resulting mixture;

(g) heating the resulting mixture at reflux for 2 hours, and then cooling it to about 25° C. and pouring it into one liter of water at 25° C.;

(h) washing the modified fluoroelastomer present in the resulting mixture five times with fresh distilled water, each washing cycle including depositing the fluoroelastomer on a filter;

(i) mixing the fluoroelastomer with one liter of acetone at 22° C.;

(j) slowly adding the resulting mixture to water at 22° C. with stirring to precipitate the fluoroelastomer, followed by filtration; and (k) drying the resulting modified fluoroelastomer in a vacuum over for two days at 60° C.

The fluoroelastomer described in step (a) was made by (1) continuously feeding (per hour) 56 parts of vinylidene fluoride, 44 parts of hexafluoropropylene and 2.8 parts of bromotrifluoroethylene to a two-liter stainless steel pressure vessel reactor which had been flushed with nitrogen while operating the stirrer of the reactor at 500 rpm for thorough mixing of the reactor contents, and while the contents of the reactor were heated at 105° C. under a pressure of 63 kg./cm.$^2$ so that the reaction mixture formed in operation (2) below underwent an emulsion polymerization reaction as it passed through the reactor, the reactor residence time being about 30 minutes;

(2) during operation 1, constantly feeding to the reactor during each hour (for each 100 parts of monomer) 400 parts of water containing 0.6 parts of ammonium persulfate and 0.12 part sodium hydroxide and maintaining the reaction mixture at a pH of 3.7;

(3) continuously removing from the reactor the resulting copolymer latex which was continuously formed during operations 1 and 2;

(4) after discarding the latex obtained during the first four residence times, collecting the desired quantity of latex and mixing it for uniformity, the latex having a pH of about 3.7 and a copolymer solids content of 19.2%; and (5) isolating the resulting copolymer from the latex by the gradual addition of a 4% aqueous solution of potassium aluminum sulfate until the copolymer is coagulated, washing the copolymer particles with distilled water, removing the water by means of a filter apparatus, and then drying the copolymer in a circulating air-over at 100° C. to a moisture content of less than 1%.

EXAMPLE 7

The product fluoroelastomer provided in step (a) of Example 6 was vulcanized by mixing 100 parts of it with 20 parts of magnesium silicate powder, 15 parts of magnesium oxide, 4 parts of triallyl isocyanurate and 3 parts of 2,5-dimethyl-2,5-ditertiarybutylperoxy hexane, and then heating it in a press for ½ hour at 166° C., followed by 24 hours in an oven at 204° C.

Two samples of this vulcanized polymer were immersed in a solution of 11 parts of $K_2S$ and 6.4 parts of sulfur in 300 parts of dimethylacetamide for ½ and 4 hours respectively at 85° C. During this treatment, the samples swelled and the surface turned black.

The treated samples were washed with distilled water and then immersed in chlorine water at 20° C. for 16 hours. Dyring this treatment, the surface color changed to light yellow.

Finally, the samples were dried in a vacuum oven at 50° C. for 48 hours.

Examination of the wettability and surface resistivity of the samples gave the results listed in Table I

TABLE I

| Time in K$_2$S Sol. (h) | Surface Resistivity (ohm cm) | Wettability |
|---|---|---|
| 0 | $1.85 \times 10^{13}$ | Not Wettable |
| 0.5 | $3.85 \times 10^{8}$ | — |
| 4 | $4.35 \times 10^{9}$ | Wettable |

Examination of the surface by ESCA showed increasing amounts of sulfur on the surface of the samples as treatment time increased.

TABLE II

| Time in K$_2$S Sol. (h) | Sulfur Intensity (cps) |
|---|---|
| 0 | 74 |
| 0.5 | 171 |
| 4 | 410 |

EXAMPLE 8

(A) A reactor was charged with

| TFE/BTFE 87/13 copolymer powder | 20 parts |
|---|---|
| Xylene | 150 parts |
| Triisopropyl phosphite | 13.5 parts |
| Di-t. butyl peroxide | 2.0 parts |

The charge was heated to 142° C. and held at that temperature for 7 hours while the vapors which formed were removed by condensation.

The resulting product was removed from the liquid by filtration, washed with xylene and then methanol, and dried at 100° C. It was found to have a phosphorus content of 1.16% and a water solubility of less that 1%.

(B) The product of (A), 7.88 parts dispersed in 40 parts of methanol, was mixed with 14.32 parts of a 55% aqueous dispersion of TFE/HFP 85/15 copolymer.

(C) To a sparging flask were added

| NaCl | 630 parts |
|---|---|
| Asbestos fibers (Chlorbestos SP-25, Johns-Manville Co.) | 63 parts |
| Distilled water | 3087 parts |

This charge was then sparged with air for 1½ hours.

(D) The product of (B) was added to the product of (C) and the mixture was sparged with air for 30 minutes.

(E) A diaphragm was formed from the slurry of (D) directly on the cathode of a laboratory chlor-alkali cell by immersing the cathode in the slurry and drawing the slurry on the cathode with vacuum according to the following schedule:

| Start | 10.2 mm of vacuum |
|---|---|
| After | |
| 1 minute | 20.3 mm |
| 2 minutes | 33 mm |
| 3 minutes | 43.2 mm |
| 4 minutes | 53.3 mm |
| 5 minutes | 66 mm |
| 6 minutes | 78.7 mm |
| 7 minutes | 99.1 mm |
| 8 minutes | 139.7 mm |
| 9 minutes | 180.3 mm |
| 10 minutes | 203.2 mm |

The cathode was then removed from the slurry, placed in a horizontal position and dried by drawing a vacuum of 203.2 mm of Hg on the manifold for 10 minutes, followed by a vacuum of 508 mm for 20 minutes. The coated cathode was then held briefly at 100° C. under a vacuum of 508 mm and was then baked for 30 minutes at 275° C.

(F) The diaphragm-cathode produced in (E) was placed into a position in a laboratory chlor-alkali cell. Direct current was applied to the electrodes. The cell required an average voltage of 3.189 to achieve a current efficiency of 95% as compared with a conventional asbestos diaphragm, which in the same application required an average voltage of 3.4–3.5.

Tetraethyl pyrophosphite and tetraethyl hypophosphate can be used in the foregoing procedure in place of triisopropyl phosphite, with substantially the same results.

I claim:

1. In a process for the electrolytic production of chlorine from brine, the improvement comrpising keeping the chlorine produced at the anode separated from the hydrogen and sodium hydroxide produced at the cathode with a diaphragm comprising a fluoropolymer provided as a hydrophilic fluoropolymer containing nonterminal units represented by the structure

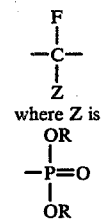

where Z is $$-\underset{\underset{OR}{|}}{\overset{\overset{OR}{|}}{P}}=O$$

where
R is an alkyl radical of 1–12 carbon atoms or a cycloalkyl radical of 3–12 carbon atoms,
the hydrophilic fluoropolymer having a phosphorus content of about 0.1–10% by weight, not more than about 1% by weight of the fluoropolymer dissolving in water at 20° C.

* * * * *